United States Patent
Masahiro et al.

(10) Patent No.: US 10,162,256 B2
(45) Date of Patent: Dec. 25, 2018

(54) METHOD AND APPARATUS FOR CAPTURING THREE DIMENSIONAL IMAGE

(75) Inventors: Takashima Masahiro, Seoul (KR);
Bong-gi Kim, Gyeonggi-do (KR);
Tae-kyung Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1068 days.

(21) Appl. No.: 13/309,189

(22) Filed: Dec. 1, 2011

(65) Prior Publication Data
US 2012/0140045 A1 Jun. 7, 2012

(30) Foreign Application Priority Data

Dec. 3, 2010 (KR) .................. 10-2010-0122841

(51) Int. Cl.
H04N 13/239 (2018.01)
G03B 11/04 (2006.01)
G03B 35/10 (2006.01)
H04N 13/243 (2018.01)

(52) U.S. Cl.
CPC ............ G03B 35/10 (2013.01); G03B 11/043 (2013.01); H04N 13/239 (2018.05); H04N 13/243 (2018.05); H04N 2213/001 (2013.01)

(58) Field of Classification Search
USPC ............... 348/49, 15, 50, E13.074; 396/324; 359/376; 349/15
See application file for complete search history.

(56) References Cited

U.S. PATENT DOCUMENTS

| 6,144,809 A * | 11/2000 | Inaba ..................... G03B 35/10 396/326 |
| 6,400,904 B1 * | 6/2002 | Kobayashi et al. .......... 396/144 |
| 2008/0225129 A1 * | 9/2008 | Viinikanoja et al. ...... 348/218.1 |
| 2008/0239135 A1 * | 10/2008 | Tamura ........................ 348/335 |
| 2008/0260365 A1 * | 10/2008 | Chang .................... G03B 29/00 396/15 |
| 2010/0188516 A1 * | 7/2010 | Kaneko et al. ............ 348/208.4 |
| 2011/0122232 A1 * | 5/2011 | Hoshino ........................ 348/47 |

FOREIGN PATENT DOCUMENTS

| JP | 2001-059932 | 3/2001 |
| KR | 10-0174324 | 5/1999 |
| KR | 1020090130719 | 12/2009 |

OTHER PUBLICATIONS

Korean Office Action dated Oct. 28, 2016 issued in counterpart application No. 10-2010-0122841, 14 pages.

* cited by examiner

Primary Examiner — Behrooz Senfi
Assistant Examiner — Ana Picon-Feliciano
(74) Attorney, Agent, or Firm — The Farrell Law Firm, P.C.

(57) ABSTRACT

An apparatus for imaging a 3D image includes an opening through which an image passes and a plurality of lens components to obtain the image, and covers up the inside thereof visible through the opening by using a covering member.

17 Claims, 8 Drawing Sheets

METHOD AND APPARATUS FOR CAPTURING THREE DIMENSIONAL IMAGE

PRIORITY

This application claims priority under 35 U.S.C. § 119(a) to Korean Patent Application No. 10-2010-0122841, filed Dec. 3, 2010, in the Korean Intellectual Property Office, the disclosure of which is incorporated herein by reference.

BACKGROUND OF THE INVENTION

1. Field of the Invention

The present invention relates generally to an apparatus for capturing a three-dimensional (3D) image, and more particularly, to an apparatus for capturing a 3D image, which covers up the inside visible through an opening thereof by using a covering member.

2. Description of the Related Art 3D or stereoscopic image technology can be used in various fields, including, for example, information and telecommunication, broadcast, medical treatment, education training, military affairs, games, animations, virtual reality, Computer Aided Design (CAD), and industrial technology.

Generally, a 3D effect, which is able to be recognized by a user, is generated by a combination of factors. Specifically, these factors include, for example, the degree that the thickness of a crystalline lens changes according to a position of an object being observed, the difference between the angles of each eye to the object, the difference between positions and shapes of object images viewed by left and right eyes, the disparity caused by movement of the object, and the effects resulting from a variety of mental states and memories of the user.

A binocular disparity, which results from a 6-7 centimeter (cm) horizontal spacing of the two eyes of the user, contributes to the factors of the 3D effect described above. Specifically, the difference in angles between each eye of the user and the object is based on the binocular disparity. Images viewed through each eye of the user are different due to the difference in angles between each eye and the object. When the two images are transmitted through respective retinas of the two eyes to the brain, the brain unites information of the two images, resulting in the sensing of an original 3D image.

In order to capture such a 3D image, an imaging apparatus is required that captures a left eye image and a right eye image for a single object through the use of two optical lens systems.

The imaging apparatus can include a left lens component and a right lens component, and have a structure that corrects the disparity of the obtained image through movement of at least one of the left lens component and the right lens component.

The imaging apparatus in which at least one of the left lens component and the right lens component is moved can also include an aperture through which the image passes.

The aperture is opened to an extent that corresponds to a distance between the at least one of the left lens component and the right lens component. However, the inside of the imaging apparatus may be visible through this aperture.

SUMMARY OF THE INVENTION

The present invention has been made to address at least the above problems and/or disadvantages and to provide at least the advantages described below. Accordingly, an aspect of the present invention provides an apparatus for capturing a 3D image having a covering member, which can cover a portion of an aperture of the apparatus that would otherwise make the interior of the apparatus visible.

According to one aspect of the present invention, an apparatus is provided for capturing a 3D image. The apparatus includes a main body having a front face and at least one aperture disposed on the front face of the main body. The apparatus also includes a plurality of lens components disposed in the main body. The plurality of lens components capture an image through the at least one aperture, and at least one of the plurality of lens components is movable. The apparatus further includes a covering member that covers a portion of an interior of the main body, which would otherwise be visible from the exterior of the main body through the at least one aperture, while allowing the image to be captured, and that operates in conjunction with the movement of the at least one of the plurality of lens components.

The at least one of the plurality of lens parts may be moved on the basis of a position of an object included the obtained image.

The plurality of lens parts may include a left eye lens part and a right eye lens part, and at least one of the left eye lens part and the right eye lens part may be moved.

Disparity information of the image may be controlled by moving the at least one of the left eye lens part and the right eye lens part.

The apparatus may further include a control unit to control the plurality of lens parts, and the control unit may move the at least one of the plurality of lens parts.

The covering member may cover up all but a portion that the lens parts occupy, among the inside of the main body visible through the opening.

The covering member may be located at any of next to the at least one of the plurality of lens parts, between the opening and the at least one of the plurality of lens parts, and behind the at least one of the plurality of lens parts.

The covering member may include a plate, at least a portion of which has a shape corresponding to that of the opening.

The plate may be connected with the at least one of the plurality of lens parts to move along with the at least one of the plurality of lens parts when the at least one of the plurality of lens parts is moved.

The covering member may include a barrier in which a plurality of boards is overlapped to or on each other to correspond to the movement of the at least one of the plurality of lens parts.

The barrier may be connected with the at least one of the plurality of lens parts, so that when the at least one of the plurality of lens parts is moved, the plurality of boards located on the side of a movement direction of the at least one of the plurality of lens parts are overlapped to or on each other and the plurality of boards located on the opposite side of the movement direction thereof is stretched out.

The covering member may include a pleated member to be retractile corresponding to a movement direction of the at least one of the plurality of lens parts.

The pleated member may be connected with the at least one of the plurality of lens parts, so that when the at least one of the plurality of lens parts is moved, a portion thereof located on the side of a movement direction of the at least one of the plurality of lens parts is folded and a portion thereof located on the opposite side of the movement direction thereof is unfolded.

The covering member may include a rolling member having one side connected to the at least one of the plurality of lens parts and the other side rolled up.

The rolling member may be configured, so that when the at least one of the plurality of lens parts is moved in a direction, a portion thereof located on the side of the movement direction of the at least one of the plurality of lens parts is rolled up and a portion thereof located on the opposite side of the movement direction thereof is unwound.

According to another aspect of the present invention, an apparatus is provided for capturing a 3D image. The apparatus includes a main body having a front face and at least one aperture disposed on the front face of the main body. The apparatus also includes a plurality of lens components disposed in the main body. The plurality of lens components capture an image through the at least one aperture and at least one of the plurality of lens parts is movable. The apparatus further include s covering member that covers a portion of an interior of the main body, which would otherwise be visible from the exterior of the main body through the at least one aperture, while allowing the image to be captured, and the operates independently from the movement of the at least one of the plurality of lens parts. The apparatus may further include a control unit to control the plurality of lens parts, and the control unit may move the at least one of the plurality of lens parts.

The covering member may be located behind the at least one of the plurality of lens parts, and include a covering film formed of a flexible material.

The covering member may have a slit formed, so that a device connected with the at least one of the plurality of lens parts passes therethrough.

According to a further aspect of the present invention a method is provided for capturing a 3D image in an apparatus. A disparity relating to images obtained through a first lens component and a second lens component is determined at a controller of the apparatus. A distance that the first lens component is to be moved is calculated based on the determined disparity at the controller. The first lens component is moved the calculated distance. A covering member that is connected to the first lens component is moved such that an interior of the apparatus that would be visible through an aperture for the first lens component, after movement of the first lens component, is covered, while allowing an image to be captured. The image is captured through the first lens component and second lens component. The image is displayed on a display unit of the apparatus.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EMBODIMENTS OF THE PRESENT INVENTION

Figure 1A:
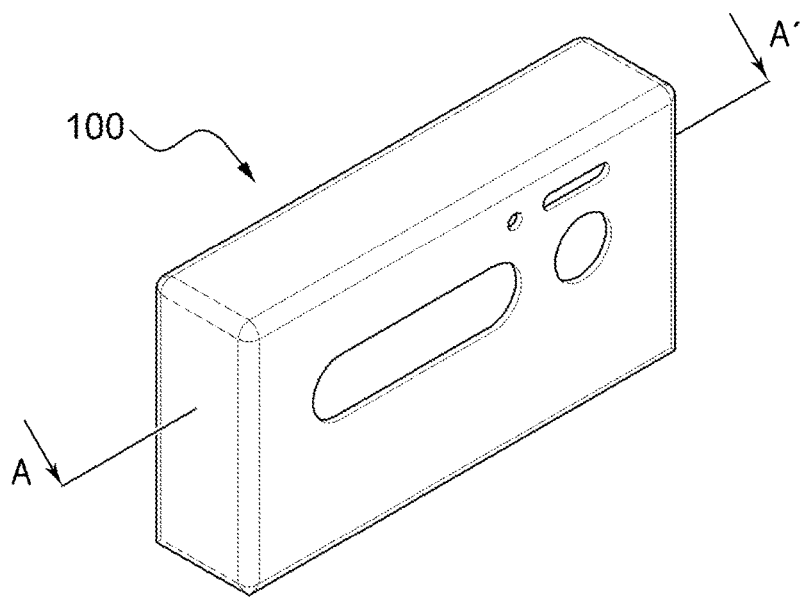
FIG. 1A is a diagram illustrating a perspective view of an apparatus for capturing a 3D image, according to an embodiment of the present invention.

Embodiments of the present invention are described in detail below with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 1B:
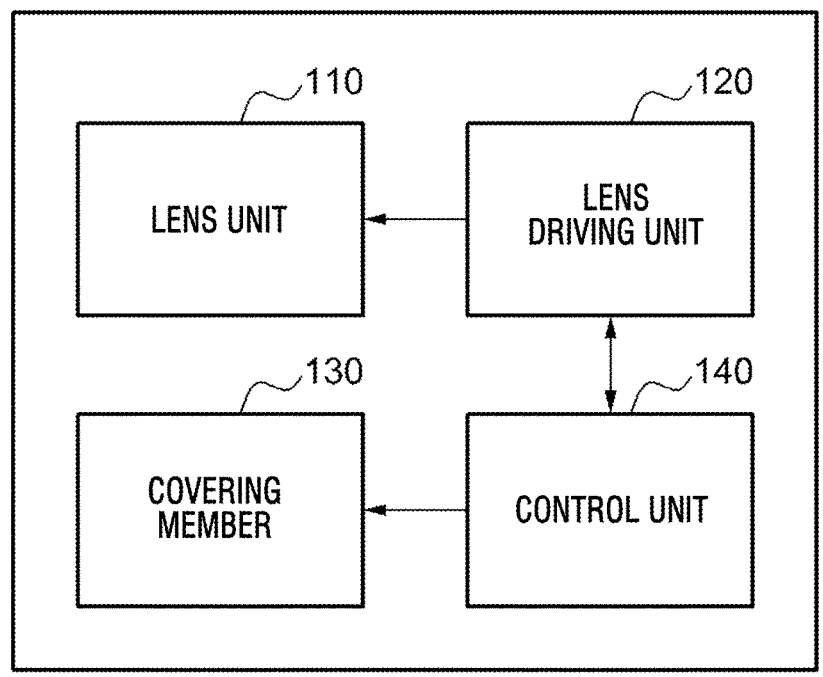
FIG. 1B is a block diagram illustrating a construction of an apparatus for capturing a 3D image, according to an embodiment of the present invention.

FIGS. 1A and 1B are diagrams illustrating a perspective view and a construction view of an apparatus 100 for capturing a 3D image, according to an embodiment of the present invention.

The apparatus 100 includes a lens unit 110, a lens driving unit 120, a covering member 130, and a control unit 140.

The lens unit 110 includes a photo sensor to detect light, a circuit to process a signal produced by the photo sensor, or similar components known in the art.

The lens unit 110 also includes a plurality of lenses, which may be utilized separately or combined to act as a zoom lens.

The photo sensor collects light that is incident on the lens unit 110, and the collected light is displayed on a display unit as a 3D image after adjustments performed by or control command received from the control unit 140.

The lens unit 110 may be embodied as a single lens, a lens set having a plurality of lenses, a plurality of lenses that include a left eye lens and a right eye lens, and a plurality of lenses that include a plurality of lens sets.

When a single lens is utilized, the lens unit 110 includes a beam splitter for dividing the image and a sensor for collecting the image.

A 3D image is obtained by using the beam splitter and the sensor.

When a left lens component and a right lens component are utilized, the left lens component collects a left eye image and the right lens component collects a right eye image.

The collected left and right eye images are displayed as a 3D image on the display unit when guided by control commands of the control unit 140.

The lens driving unit 120 includes an actuator, a shaft, and a position sensor.

The lens driving unit 120 adjusts positioning of the lens unit 110 in order to change a disparity or parallax of the 3D image, thereby allowing the lens unit 110 to obtain an image that is within a permitted limit.

The lens driving unit 120 is able to adjust positioning of the lens unit 110, by moving the shaft, upon which the lens unit 110 is supported, by using the actuator.

The lens driving unit 120 determines an amount of movement of the lens unit 110 or a position of the lens unit 110 by using the position sensor.

The covering member 130 is operated in conjunction with the movement and position of the lens unit 110.

The covering member 130 is independently operated based on the movement and position of the lens unit 110.

The covering member 130 covers a portion of the aperture that exposes an interior of the apparatus 100 after movement of the lens unit 110.

The aperture is disposed on a front face of the apparatus 100. The lens unit 110 is disposed behind the aperture, and obtains an image through the aperture.

In order to obtain an optimal 3D image from data obtained by the lens driving unit 120, the control unit 140 transmits a signal to the lens driving unit 120 to control movement of the lens unit 110.

The control unit 140 controls the movement of the covering member 130, according to a motion or gesture of the user, or according to an inputted signal.

The control unit 140 controls the apparatus 100 according to a signal inputted through the display unit, and displays 3D images on the display unit that are captured through the lens unit 110.

The display unit displays the captured 3D image, and also displays words or items for interaction with the user.

Signals received from user selection of the words or items are transmitted to the control unit 140, and the control unit 140 controls the 3D imaging apparatus 100 in response to the transmitted signals.

Figure 2A:
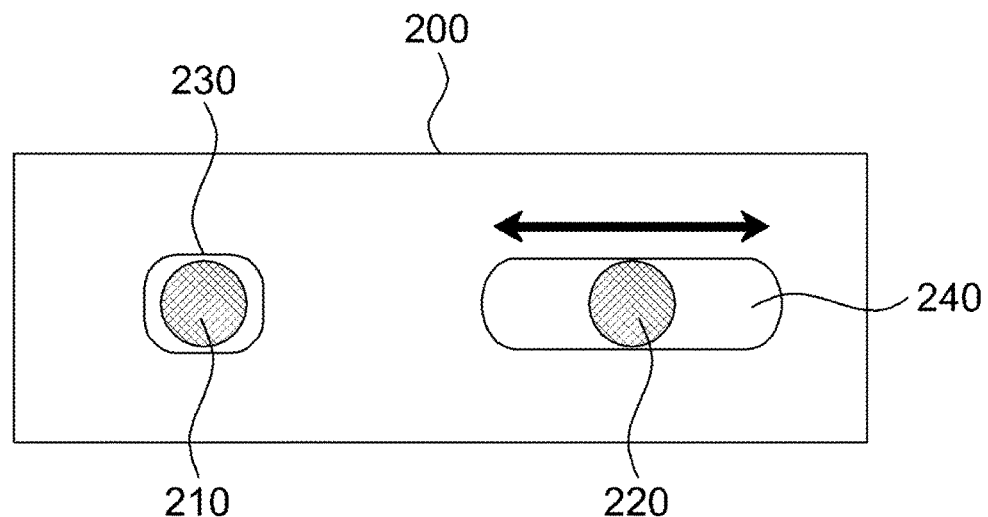
FIG. 2A is a diagram illustrating a front view of the apparatus for capturing a 3D image, according to an embodiment of the present invention.
Figure 2B:
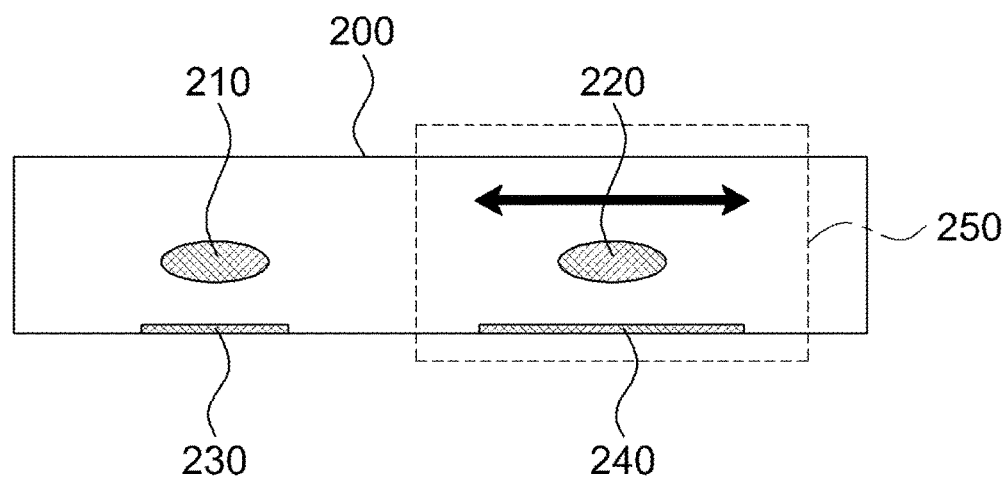
FIG. 2B is a diagram illustrating a top view of the apparatus for capturing a 3D image, according to an embodiment of the present invention.

FIGS. 2A and 2B are diagrams illustrating front and top views of the apparatus 100 having an aperture 240, according to an embodiment of the present invention.

FIGS. 2A and 2B illustrate a portion of the 3D imaging apparatus 100 of FIG. 1.

FIG. 2A illustrates a partial front structure of the apparatus 100, viewed in a direction of optical axis through which images are incident on the apparatus 100.

FIG. 2B illustrates is a partial cross-section of the apparatus 100, viewed in a direction perpendicular to the direction of optical axis.

The 3D imaging apparatus 100 includes a main body 200, a left lens component 210, a right lens component 220, a left aperture 230, and a right aperture 240.

The covering member 130 is disposed in the area defined by the dotted in FIG. 2B.

The left and the right lens components 210 and 220 capture left and right eye images, respectively. The captured images are overlapped in order to display a 3D image at the apparatus 100.

The actuator may move at least one of the left and the right lens components 210 and 220. In the embodiment shown in FIGS. 2A and 2B, the actuator moves the right lens component 220.

The main body 200 includes the actuator and the shaft, and at least one of the left and the right lens components 210 and 220 may be supported and moved by the shaft. In the embodiment shown in FIGS. 2A and 2B, the shaft supports and moves the right lens component 220.

To change a rotary movement of the actuator into a linear movement of the right lens component 220 supported by the shaft, a rack gear and a pinion gear are also provided in the main body 200.

One of the rack gear and the pinion gear is connected to the actuator, and the other of the rack gear and the pinion gear is connected to the right lens component 220.

The control unit 140 may adjust a disparity between the left eye image and the right eye image by moving the actuator.

Since a distance between the left and the right lens components 210 and 220 is adjustable, the disparity between the left and the right eye images obtained through the left and the right lens components 210 and 220 can be adjusted.

In the embodiment of the present invention shown in FIGS. 2A and 2B, the control unit 140 controls the movement of the right lens component 220.

The covering member 130 may be disposed above the right aperture 240, proximate to the right lens component 220, between the right aperture 240 and the right lens component 220, or behind the right lens component 220.

The covering member 130 is preferably a retractile and flexible material of a dark or black color to absorb light.

The covering member 130 preferably covers all of the interior of the apparatus that is visible through the right aperture 240, with the exception of the right lens component 220, when the main body 200 is viewed along the optical axis as shown in FIG. 2A.

The covering member 130 may be operated in conjunction with or independently from the movement of the right lens component 220.

In an embodiment of the present invention, the covering member 130 is connected to the right lens component 220, so that it can be moved, stretched or compressed according to the movement of the right lens component 220.

In another embodiment of the present invention, the covering member 130 is disposed independently from the right lens component 220 in the main body 200, so that it covers a portion of the right aperture 240 regardless of the movement of the right lens component 220.

At least one of the left aperture 230 and the right aperture 240 may include a transparent window.

The transparent window is formed of at least one of a glass, a transparent plastic, and an acryl.

The transparent window is preferably formed, so that it is able to exclude light by using a principle of polarization. This prevents the interior of the apparatus 100 from being viewed from an exterior of the apparatus 100, while still allowing the lens to view the exterior from the interior.

Specifically, the interior of the apparatus 100 is not visible through the right opening 240, but images are able to be captured using the left lens component 210 and the right lens component 220.

In FIGS. 2A and 2B, the right aperture 240 is illustrated as being elongated in accordance with the movement of the right lens component 220. According to a structure of the main body 200, however, the left aperture 230 may instead be elongated in accordance with a movement of the left lens component 210.

If both the left lens component 210 and the right lens component 220 are movable, the left and the right apertures 230 and 240 may be elongated in accordance with the movements of the left and the right lens component 210 and 220, respectively.

The left lens component 210, which includes a left eye lens and a left eye sensor, and the right lens component 230, which includes a right eye lens and a right eye sensor, are separated from each other.

A distance between the left lens component 210 and the right lens component 230 is referred to as an Inter Camera Distance (ICD).

The left eye sensor functions to capture the left eye image, which is incident through the left eye lens. The left eye image captured at the left eye sensor is controlled by the control unit 140.

The right eye sensor functions to capture the right eye image, which is incident through the right eye lens. The right eye image captured at the right eye sensor is controlled by the control unit 140.

The left and the right eye images are captured in real time, and the control unit 140 controls display of the left and the right eye images in real time on the display unit.

The actuator may control the movement of the left lens component 210, and also control the movement of the right lens component 220. During or after the movement of the left lens component 210 or the right lens component 220, the apparatus 100 can capture the left and the right eye images.

The control unit 140 controls the actuator to adjust the ICD, and collect left and right eye images having a 3D effect through the adjusted ICD.

When a still image is being captured, the left and the right eye images are captured at the adjusted ICD. When a video is being captured, the ICD may be fixed, or varied as the actuator is adjusted in real time according a change in scenes received at the right and left lens components 210 and 220.

Information on the ICD is preferably displayed on the display unit.

The user may automatically or manually adjust the ICD in the apparatus 100.

In an embodiment of the present invention, the control unit 140 minimizes a difference in color, Auto Exposure (AE), Auto White Balance (AWB), or geometric form between the left and the right eye images. These minimizations result in a more natural 3D image when the 3D image is generated from the left and the right eye images.

In an embodiment of the present invention, the control unit 140 calculates a maximum disparity, a minimum disparity, a disparity of certain object, or a feature in the left and the right eye images, and controls the 3D image based on these calculations so that it is easier to view and has an enhanced 3D effect.

In the apparatus 100 of the present invention having the left lens component 210 and the right lens component 220, if there is a difference between the left and the right eye lenses or a difference between the left and right eye sensors, the left and the right images may not coincide. The left and the right images must coincide through a signal processing.

Due to a geometric difference, such as a difference between the left and the right eye lenses or the left and the right eye sensors included in the left and the right lens component 210 and 220, respectively, a feature point deviation may occurs between the left eye images and the right eye images.

Also, a difference in size between the left eye images and the right eye images may be produced according to a difference in zoom between the left lens component 210 and the right lens component 220.

The above geometric difference is difficult to be produced in a 2D imaging apparatus, but may be produced in the 3D imaging apparatus.

The less the geometric difference is, the easier the image is to view and the greater the 3D effect that the user feels for the image.

The control unit 140 may minimize the geometric difference by using, for example, a shift, a crop, a resize, or an affine transformation, between the left eye images and the right eye images.

The left lens component 210 and the right lens component 220 of the apparatus 100 perform in a manner similar to that of human eyes. Images captured by left and right eyes, respectively, are united at the brain, so that a 3D effect may be felt. Similarly, the apparatus 100 captures the left and the right eye images through the left and the right lens components 210 and 220, respectively.

The captured left and right eye images may be displayed on the display unit through various methods. A method of display may be applied so that the left eye image corresponding to the left eye is viewed only with the left eye and the right eye image corresponding to the right eye is viewed only with the right eye. Accordingly, the left and the right eye images are united at the brain, and thus the 3D effect felt through the united left and right eye images as if a real object is viewed.

One reason that a person feels a 3D effect from the left and the right eye images is because of the disparity or parallax.

Since the left lens component 210 and the right lens component 220 are not disposed in the same position, and are spatially separated from each other, to produce a difference in view point, the disparity occurs.

Specifically, images for the same object that are captured by the left and the right eye sensors have a difference in position. In general, the disparity increases as the distance between the object and the sensors decreases.

The control unit 140 calculates information on the disparity, so that the 3D image is easier to view and has an enhanced 3D effect.

The apparatus 100 may include the left eye lens and the left eye sensor, or the right eye lens and the right eye sensor.

The apparatus 100 may also include one of the left eye lens and the right eye lens, which is commonly used by the left eye sensor and the right eye sensor.

The 3D imaging apparatus 100 may be made up of one of the left eye lens and the right eye lens and one of the left eye sensor and the right eye sensor.

At least one of the left eye lens and the right eye lens may be movable to minimize the disparity of the 3D image and enhance the 3D effect.

In addition to disparity, another important factor for generating the 3D effect is convergence.

Convergence occurs when the left eye lens and the right eye lens are focused onto an object in the 3D image.

When the convergence occurs, a point on the object becomes a convergence point and an angle between the left eye lens and the right eye lens becomes a convergence angle.

Specifically, the convergence point is a position where the disparity is at a minimum. A point on the object upon which the left eye lens and the right eye lens are focused becomes the convergence point.

The convergence angle is an angle formed at the convergence point to the left eye lens and the right eye lens. In general, the convergence angle is small for remote objects and large for close objects.

The control unit 140 can utilize the convergence angle to calculate a distance of the object. The 3D effect of the object can also be determined.

As a disparity value of the left and the right eye images decreases, the ease in viewing the 3D image and the 3D effect increases. If the object becomes the convergence point, the disparity value of the object approaches 0 and a position of the object is displayed on the display unit.

Figure 2C:
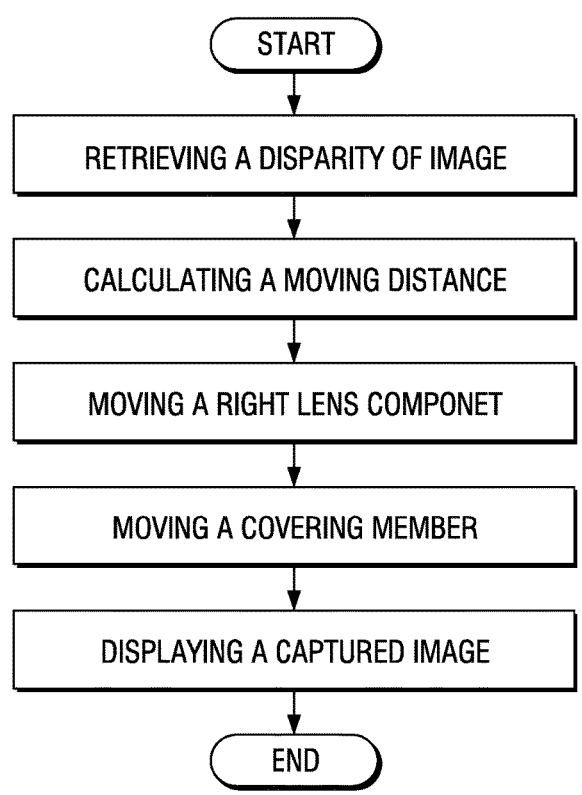
FIG. 2C illustrates an operating method of the 3D imaging apparatus with the covering member, according to an embodiment of the present invention.

FIG. 2C illustrates an operating method of the 3D imaging apparatus 100 with the covering member, described in detail below.

The 3D imaging apparatus 100 is turned on, and a disparity of images obtained through the left lens component 210 and the right lens component 220 is retrieved.

A distance that the right lens component 220 is to be moved is calculated according to the retrieved disparity.

The right lens component 220 is moved by the calculated distance. The covering member 130 that is connected to the right lens component 220 is also moved such that an interior of the apparatus 100 that would be visible through the right aperture 240 after movement of the right lens component is covered.

After the movement of the right lens component 220, an image is captured with the apparatus 100.

The captured image is displayed on the display unit.

If the right lens component 220 and the covering member 130 are not connected, they are able to move independently.

Figure 3:
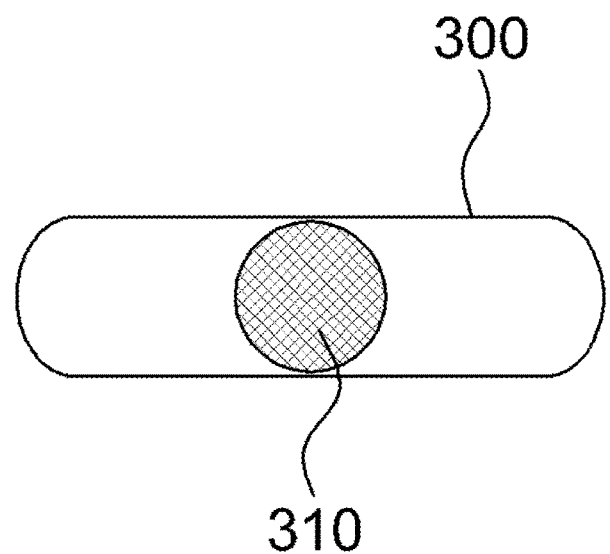
FIG. 3 is a diagram illustrating a covering member of the apparatus, according to an embodiment of the present invention.

FIG. 3 is a diagram illustrating a front view of a covering member of the apparatus 100, according to an embodiment of the present invention.

In an embodiment of the present invention the covering member 300 is embodied as a plate, at least a portion of which has a shape corresponding to the right aperture 240 to enable covering of the right aperture 240.

The covering member 300 may be disposed on both sides of a right lens component 310, or behind the right lens component 310, which is in a direction opposite that of where the right lens component 310 collects images.

If the covering member 300 is disposed on both sides of the right lens component 310 and connected to both sides of the right lens component 310, it can move in conjunction with the right lens component 310. In this embodiment of the present invention, the covering member 300 is more elongated on both sides by an amount of movement of the right lens component 310 to the left and the right.

Accordingly, when the right lens component 310 is moved based on a disparity of the images, the covering member 300 is moved therewith.

With the movement of the covering member 300, the interior of the apparatus 100 that would have been otherwise exposed is covered.

When the covering member 300 is disposed behind the right lens component 310 and is connected to the main body 200 but not the right lens component 310, it can be independently operated in accordance with the movement of the right lens component 310.

To independently move the covering member 300 from the movement of the right lens component 310, a motor used for the covering member 300 may be separately provided from a motor for the right lens component 310.

When the covering member 300 is connected to the back of the right lens component 310 and located behind the right lens component 310, it can move in conjunction with the movement of the right lens component 310.

The control unit 140 may control the movement of the right lens component 310, or the movement of the covering member 300, which moves in conjunction with the movement of the right lens component 310.

Figure 4:
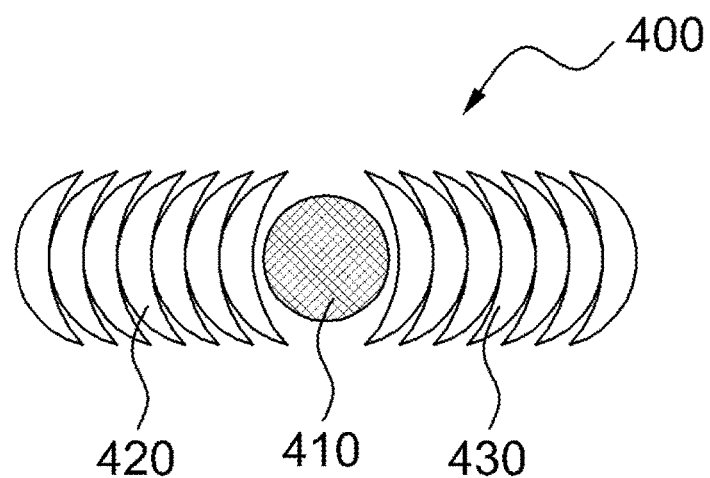
FIG. 4 is a diagram illustrating a covering member of the apparatus, according to another embodiment of the present invention.

FIG. 4 is a diagram illustrating a front view of a covering member of the apparatus 100, according to another embodiment of the present invention.

The covering member 400 may include a left barrier 420 and a right barrier 430. Each barrier includes a plurality of overlapping boards.

The left and right barriers 420 and 430 may be connected with a right lens component 410, so that when the right lens component 410 is moved in one direction, the boards disposed on the side to which the right lens component 410 is moved are overlapped and the boards disposed on the opposite side are stretched out from each other, decreasing the degree of overlap.

More specifically, when the right lens component 410 is moved to the left, the boards of the left barrier 420 begin to overlap in conjunction with the movement of the right lens component 410 to decrease the length of the left barrier 420.

When the right lens component 410 is moved to the left, the boards of the right barrier 430 are moved in conjunction with the movement of the right lens component 410, decreasing the amount of overlap in the boards and increasing the length of the right barrier 430.

A first end of the left barrier 420 is connected to the right lens component 410 and a second end of the left barrier 420 is connected to the main body 200 of the apparatus 100.

A first end of the right barrier 430 is connected to the right lens component 410 and a second end of the right barrier 430 is connected to the main body 200 of the apparatus.

As the left barrier 420 and the right barrier 430 move in conjunction with the movement of the right lens component 410 as described above, the interior of the apparatus 100, which would other wise be visible from the exterior through the right aperture 240, can be covered.

The control unit 140 may control the movement of the right lens component 410, and the operation of the left barrier 420 and the right barrier 430, which moves in conjunction with the movement of the right lens component 410.

Figure 5:
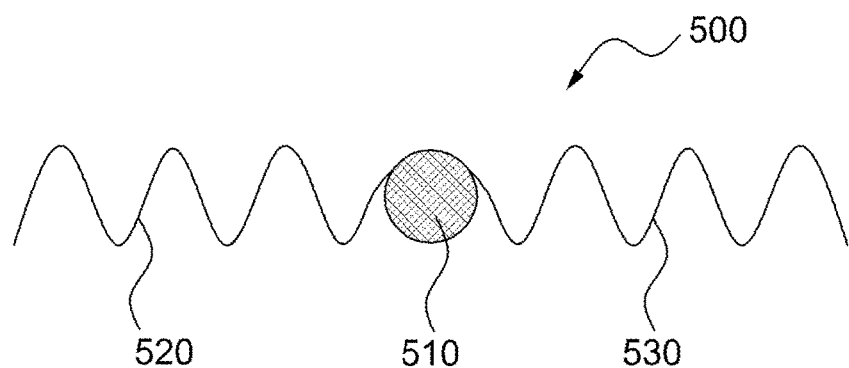
FIG. 5 is a diagram illustrating a covering member of the apparatus, according to an additional embodiment of the present invention.

FIG. 5 is a diagram illustrating a top view of a covering member of the apparatus 100, according to an additional embodiment of the present invention.

In this embodiment of the present invention, a covering member 500 is embodied as retractile pleated members.

The pleated members may be formed of a soft material, such as, for example, a fabric, a rubber, or a plastic.

The pleated members include a left pleated member 520 and a right pleated member 530.

The pleated members are connected with a right lens component 510, so that when the right lens component 510 is moved in one direction, the pleated member disposed on the toward which the right lens component 510 moves is folded, and the pleated member disposed on the opposite side is unfolded.

Specifically, when the right lens component 510 is moved to the left, pleats of the left pleated member 520 are folded, and when the right lens component 510 is moved to the right, pleats of the right pleated member 530 are folded.

As the left pleated member 520 and the right pleated member 530 are operated in conjunction with the movement of the right lens component 510 as described above, the interior of the apparatus 100, which otherwise would have been visible from the exterior through the right aperture 240, can be covered.

A first end of the left pleated member 520 is connected to the right lens component 510, and a second end of the left pleated member 520 is connected to the main body 200 of the apparatus 100.

A first end of the right pleated member 530 is connected to the right lens component 510, and a second end of the right pleated member 530 is connected to the main body 200 of the apparatus 100.

The control unit 140 may control the movement of the right lens component 510, and the operation of the left pleated member 520 and the right pleated member 530, which moves in conjunction with the movement of the right lens component 510.

Figure 6:
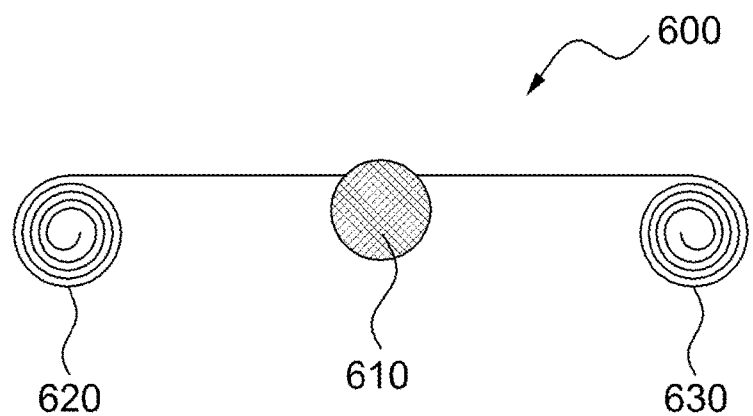
FIG. 6 is a diagram illustrating a covering member of the apparatus, according to a further embodiment of the present invention.

FIG. 6 is a diagram illustrating a top view of a covering member of the apparatus 100, according to a further embodiment of the present invention.

In this embodiment of the present invention, a covering member 600 is embodied as rolling members, around which each winds a flexible material in a circular form.

The rolling members include a left rolling member 620 and a right rolling member 630. Each of the left rolling member 620 and the right rolling member 630 may be configured, so that an elastic force thereof is applied in a winding up direction.

The flexible material of the rolling members is connected to a right lens component 610, so that when the when the right lens component 610 is moved in one direction, the rolling member disposed on the side toward which the right lens component 610 moves rolled up the flexible material, and the flexible material of the rolling member disposed on the opposite side is unwound.

Specifically, when the right lens component 610 is moved to the left, the flexible material of the left rolling member 620 is rolled up, and when the right lens component 610 is moved to the right, the flexible material of the right rolling member 630 is rolled up.

As the left rolling member 620 and the right rolling member 630 are operated in conjunction with the movement of the right lens component 610 as described above, the interior of the apparatus, which would otherwise be visible from the exterior through the right aperture 240, can be covered.

A first end of the left rolling member 620 is connected to the right lens component 610, and a second end of the left rolling member 620 is connected to the main body 200.

A first end of the right rolling member 630 is connected to the right lens component 610, and a second end of the right rolling member 630 is connected to the main body 200.

The control unit 140 may control the movement of the right lens component 610, and the operation of the left rolling member 620 and the right rolling member 630, which move in conjunction with the movement of the right lens component 610.

Figure 7:
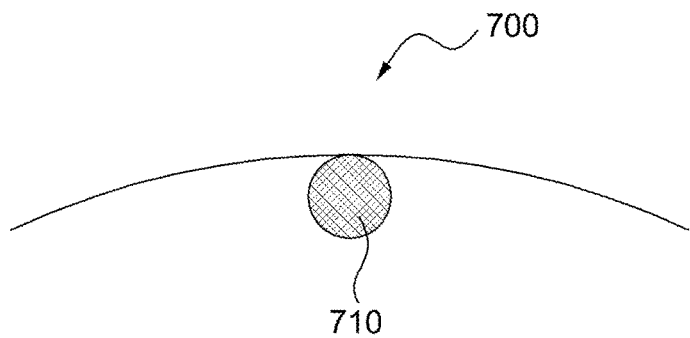
FIG. 7 is a diagram illustrating a covering member of the apparatus, according to another embodiment of the present invention.

FIG. 7 is a diagram illustrating a top view a covering member of the apparatus 100, according to another embodiment of the present invention.

In this embodiment of the present invention, a covering member 700 is embodied as a covering film formed of a flexible material.

The covering film is disposed behind a right lens component 710, and is connected to the main body 200 of the apparatus 100. The covering film can independently cover the interior of the apparatus 100.

Specifically, the covering film is not connected to the right lens component 710, but is disposed behind the right lens component 710, which is in a direction that is opposite that of where the right lens component 710 obtains an image.

In an embodiment of the present invention, the covering film is connected to the back of the right lens component 710, to cover the interior of the apparatus 100 in conjunction with the movement of the right lens component 710.

In another embodiment of the present invention, a first end of the covering film is connected to the right lens component 710 and a second end of the covering film is connected to the main body 200, so that it can move in conjunction with the right lens component 710.

The control unit 140 may control the movement of the right lens component 710, and the operation of the covering film, which moves in conjunction with the movement of the right lens component 710.

Figure 8:
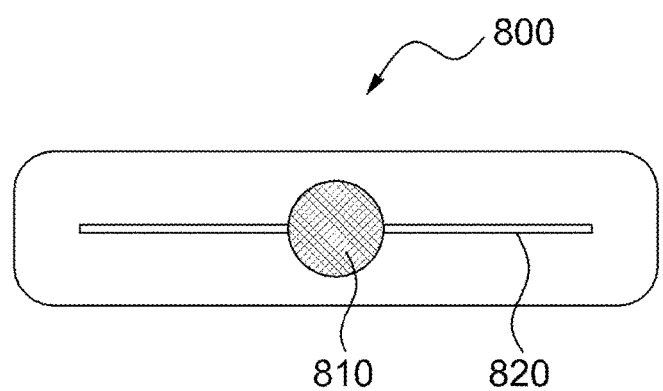
FIG. 8 is a diagram illustrating a covering member of the apparatus, according to an embodiment of the present invention.

FIG. 8 is a diagram illustrating a front view of a covering member of the apparatus 100, according to an embodiment of the present invention.

Covering member 800 may be a covering film formed of a flexible material, similar to that of the covering member 700 of FIG. 7.

The covering film may be disposed behind a right lens component 810 to independently cover up the interior of the apparatus 100.

Specifically, the covering film is not connected to the right lens component 810, but located behind the right lens component 810, which is in a direction opposite that of where the right lens component 810 obtains an image.

The covering film has a slit 820 through which a device connected with the right lens component 810 passes.

The right lens component 810 and the device supporting the right lens component 810 are moved along the slit 820, and the covering film remains fixed to the main body 820.

The covering film may be fixed to the back of the right lens component 810 to cover the interior of the apparatus, which would otherwise be visible from the exterior through the right aperture 240.

The control unit 130 may control the movement of the right lens component 810.

Figure 9A:
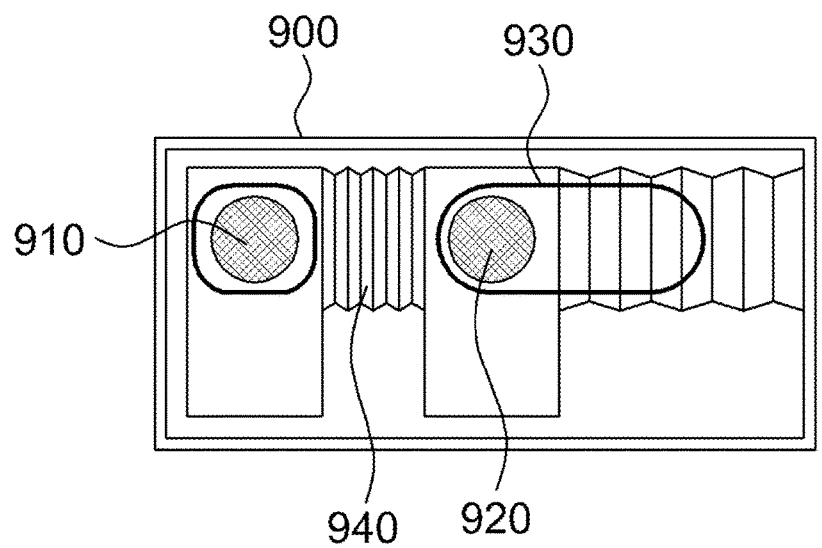
FIGS. 9A and 9B are diagrams illustrating the apparatus with the covering member, according to an embodiment of the present invention.
Figure 9B:
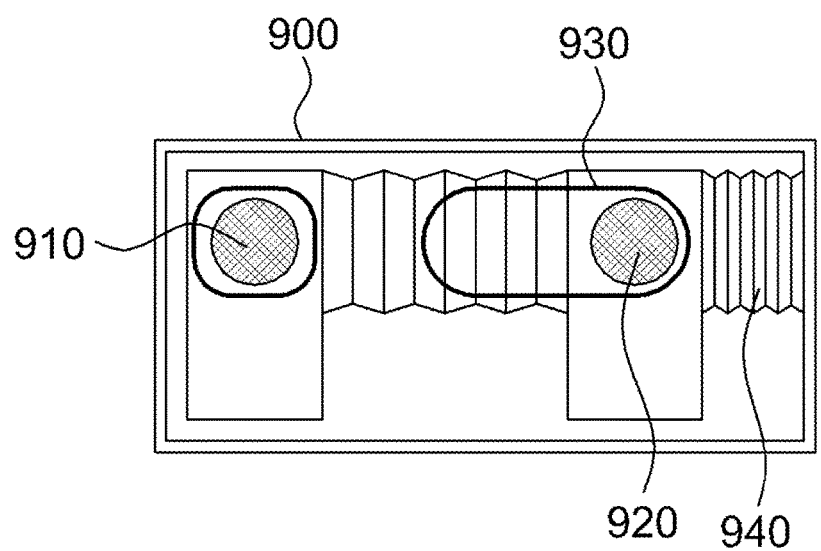

FIGS. 9A and 9B are diagrams illustrating the apparatus 100 having a covering member, according to an embodiment of the present invention. A covering member 940 cover interior of a main body 900 in conjunction with at least one of a left lens component 910 and a right lens component 920.

The main body 900 includes the left lens component 910, the right lens component 920, a right aperture 930, and the covering member 940.

The covering member 940 is embodied as retractile pleated members, as described above in FIG. 5.

FIG. 9A is a diagram illustrating the apparatus 100 in which the left lens component 910 is fixed, the right lens component 920 is moved in a direction toward the left lens component 910, and the covering member 940 is connected with the right lens component 920, and operates in conjunction with the right lens component 920.

FIG. 9B is diagram illustrating the apparatus 100 in which the left lens component 910 is fixed, the right lens component 920 is moved in a direction away from the left lens component 910, and the covering member 940 is connected with the right lens component 920, and operates in conjunction with the right lens component 920.

The covering member 940, which is connected to the right lens component 920, can be lengthened as the right lens component 920 moves away from it and can be compressed as the right eye lens 920 moves toward it.

Since the covering member 940 has elasticity, it can easily be lengthened or compressed to cover the interior of the apparatus 100, which would otherwise be visible through the right aperture 930, without affecting the movement of the right lens component 920.

FIGS. 9A and 9B illustrate one embodiment of the apparatus 100 in which the right lens component 920 is moved and the covering member 940 is moved in conjunction with the right lens component 920. However, the present invention is not limited thereto.

For example, the apparatus 100 may be configured, so that a covering member 940, which moves in conjunction with the right lens component 920 when the right lens component 920 is moved, is provided in accordance with a structure of the main body 900.

The apparatus 100 may also be configured, so that a left lens component 910 is moved and a cover member 940 is moved in conjunction with the left lens component 910, and a right lens component 920 is moved and a cover member 940 is moved in conjunction with the right lens component 920, in accordance with the structure of the main body 900.

Figure 10A:
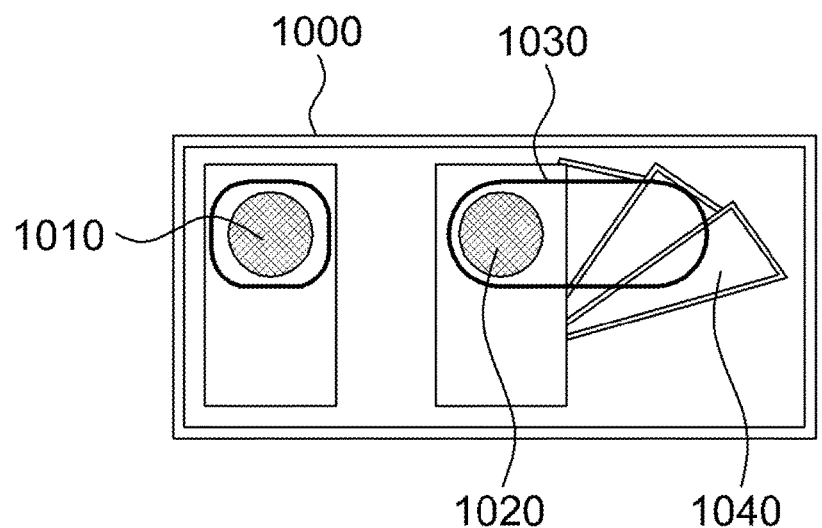
FIGS. 10A and 10B are diagrams illustrating the apparatus with a covering member, according to another embodiment of the present invention.
Figure 10B:
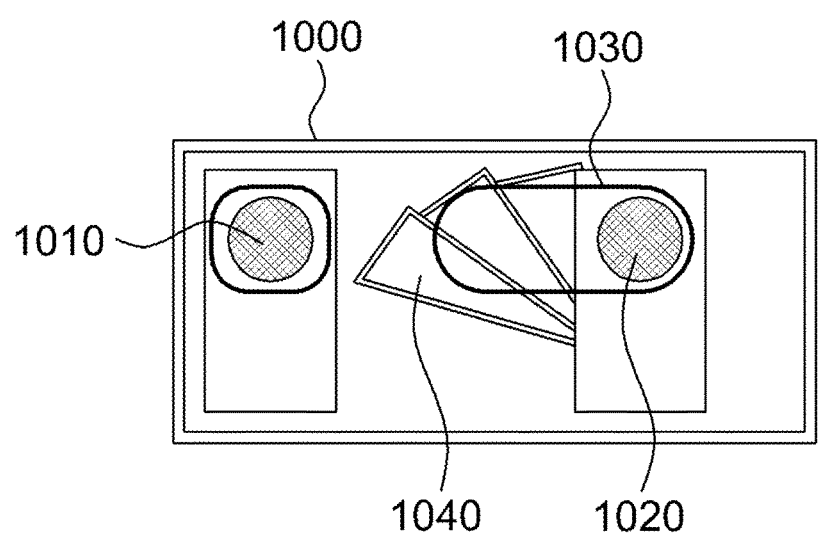

FIGS. 10A and 10B are diagrams illustrating the apparatus 100 having a covering member, according to another embodiment of the present invention. A covering member 1040 covers the interior of a main body 1000 in conjunction with at least one of a left lens component 1010 and a right lens component 1020.

The main body 1000 may include the left lens component 1010, the right lens component 1020, a right aperture 1030, and the covering member 1040.

In this embodiment of the present invention, the covering member 1040 is embodied as a barrier in which a plurality of plates overlap.

FIG. 10A is a diagram illustrating the apparatus 100 in which the left lens component 1010 is fixed, the right lens component 1020 is moved in a direction toward the left lens component 1010, and the covering member 1040 is connected to the right lens component 1020, and operates in conjunction with the right lens component 1020.

FIG. 10B is a diagram illustrating the apparatus 100 in which the left lens component 1010 is fixed, the right lens component 1020 is moved in a direction away from the left lens component 1010, and the covering member 1040 is connected with the right lens component 1020, and operates in conjunction with the right lens component 1020.

When the right lens component 1020 is moved in the direction toward the left lens component 1010, the covering member 1040 can be unfolded or stretched out in a direction away from the left lens component 1010.

When the right lens component 1020 is moved in the direction away from the left lens component 1010, the covering member 1040 can be stretched out in a direction toward the left lens component 1010.

Specifically, the covering member 1040 is connected to a portion of the right lens component 1020, so that it can operate in a direction opposite that of a movement of the right lens component 1020.

As the covering member 1040 is operated to stretch out in the direction opposite that of the movement of the right lens component 1020 as described above, the interior of the main body 1000, which would otherwise be visible through the right aperture 1030, can be covered.

The apparatus 100 may be configured, so that a right lens component 1020 is moved and a covering member 940 is operated in conjunction with the right lens component 1020, in accordance with a structure of the main body 1000.

The apparatus 100 may also be configured, so that a left lens component 1010 is moved and a cover member 1040 is operated in conjunction with the left lens component 1010, and a right lens component 1020 is moved and a cover member 1040 is moved in conjunction with the right lens component 1020, in accordance with a structure of the main body 1000.

According to the embodiments described above, the present invention provides techniques, which can cover the interior of the 3D apparatus 100, which would otherwise be visible from the exterior through the aperture, by using the covering member.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An apparatus for capturing a three-dimensional image, comprising:
a main body having a front face and one or more apertures disposed on the front face;
a plurality of lens components disposed in the main body, wherein the plurality of lens components transfer light for capturing an image through the one or more apertures and at least one of the plurality of lens components is movable; and
a covering member, that covers a portion of an interior of the main body, which is visible from an exterior of the main body through at least one aperture corresponding to the at least one movable lens component among the one or more apertures, except a portion of the interior of the main body that includes the at least one movable lens component, while allowing the image to be captured through the at least one aperture corresponding to the at least one movable lens component, and that operates according to movement of the at least one of the plurality of lens components,
wherein the covering member comprises first and second pleated members that are retractile in accordance with a movement direction of the at least one of the plurality of lens components, and
wherein the first and second pleated members are connected to the at least one of the plurality of lens components, so that when the at least one of the plurality of lens components is moved, the first pleated member disposed on a side of the at least one of the plurality of lens components toward which the at least one of the plurality of lens components is moved, is folded, and the second pleated member disposed on an opposing side of the at least one of the plurality of lens components is unfolded.

2. The apparatus of claim 1, wherein the at least one of the plurality of lens components is moved in accordance with a position of an object that to be captured in the image.

3. The apparatus of claim 1, wherein the plurality of lens components comprises a left lens component and a right lens component, and wherein at least one of the left lens component and the right lens component is movable.

4. The apparatus of claim 3, wherein disparity information of the image is adjusted by moving the at least one of the left lens component and the right lens component.

5. The apparatus of claim 1, further comprising a control unit that controls the plurality of lens components, wherein the control unit controls movement of the at least one of the plurality of lens components.

6. The apparatus of claim 1, wherein the covering member is disposed next to the at least one of the plurality of lens components, between the at least one of the one or more apertures and the at least one of the plurality of lens components, or behind the at least one of the plurality of lens components.

7. The apparatus of claim 1, wherein the covering member comprises a plate, wherein at least a portion of the plate has a shape that corresponds to the shape of the at least one of the one or more apertures.

8. The apparatus of claim 7, wherein the plate is connected to the at least one of the plurality of lens components and moves in conjunction with the at least one of the plurality of lens components.

9. The apparatus of claim 1, wherein the covering member comprises first and second barriers each having a plurality of boards that overlap in accordance with movement of the at least one of the plurality of lens components.

10. The apparatus of claim 9, wherein the first and second barriers are connected to the at least one of the plurality of lens components, so that when the at least one of the plurality of lens components is moved, the plurality of boards of the first barrier disposed on a side of the least one of the plurality of lens components toward which the at least one of the plurality of lens components is moved, are overlapped, and the plurality of boards of the second barrier disposed on an opposing side of the at least one of the plurality of lens components are overlapped to a lesser degree.

11. The apparatus of claim 1, wherein the covering member comprises first and second rolling members, each having one side of a flexible material connected to the at least one of the plurality of lens components and the other side of the flexible material rolled on the rolling members.

12. The apparatus of claim 11, wherein the first and second rolling members are configured, so that when the at least one of the plurality of lens components is moved, the first rolling member disposed on a side of the at least one of the plurality of lens components toward which the at least one of the plurality of lens components is moved, rolls up its corresponding flexible material, and the second rolling member disposed on an opposing side of the at least one of the plurality of lens components unwinds its corresponding flexible material.

13. An apparatus for capturing a three-dimensional (3D) image, comprising:
a main body having a front face and one or more apertures disposed on the front face;
a plurality of lens components disposed in the main body, wherein the plurality of lens components transfer light for capturing an image through the one or more apertures and at least one of the plurality of lens components is movable; and
a covering member that covers a portion of an interior of the main body, which is be visible from an exterior of the main body through at least one aperture corresponding to the at least one movable lens component among the one or more apertures, except a portion of the interior that includes the at least one movable lens component, while allowing the image to be captured through the at least one aperture corresponding to the at least one movable lens component the one or more apertures, and that operates independently from movement of the at least one of the plurality of lens components,
wherein the covering member comprises first and second pleated members that are retractile in accordance with a movement direction of the at least one of the plurality of lens components, and
wherein the first and second pleated members are connected to the at least one of the plurality of lens components, so that when the at least one of the plurality of lens components is moved, the first pleated member disposed on a side of the at least one of the plurality of lens components toward which the at least one of the plurality of lens components is moved, is folded, and the second pleated member disposed on an opposing side of the at least one of the plurality of lens components is unfolded.

14. The apparatus of claim 13, further comprising a control unit that controls the plurality of lens components, wherein the control unit controls the movement of the at least one of the plurality of lens components.

15. The apparatus of claim 13, wherein the covering member is disposed behind the at least one of the plurality of lens components, and comprises a covering film formed of a flexible material.

16. The apparatus of claim 13, wherein the covering member comprises a slit through which a device connected to the at least one of the plurality of lens components passes.

17. A method for capturing a three-dimensional (3D) image in an apparatus, comprising the steps of:
determining a disparity relating to images obtained through a first lens component and a second lens component at a controller of the apparatus;
calculating a distance that the first lens component is to be moved based on the determined disparity at the controller;
moving the first lens component the calculated distance;
moving a covering member that is connected to the first lens component such that an interior of the apparatus that is visible through an aperture for the first lens component after movement of the first lens component, is covered except a portion of the interior that includes the first lens component, while allowing an image to be captured through the aperture for the first lens component;
capturing the image through the first lens component and the second lens component; and displaying the image on a display unit of the apparatus,
wherein the covering member comprises first and second pleated members that are retractile in accordance with a movement direction of the at least one of the first lens component and the second lens component, and
wherein the first and second pleated members are connected to the at least one of the plurality of lens components, so that when the at least one of the first lens component and the second lens component is moved, the first pleated member disposed on a side of the at least one of the first lens component and the second lens component toward which the at least one of the first lens component and the second lens component is moved, is folded, and the second pleated member disposed on an opposing side of the at least one of the first lens component and the second lens component is unfolded.

* * * * *